UNITED STATES PATENT OFFICE.

CARMEN OLGA LOTTERO, OF BUENOS AIRES, ARGENTINA.

PROCEEDING FOR THE PRODUCTION OF A PASTE DESTINED FOR THE MANUFACTURE OF PAPER, CARDBOARD, AND THE LIKE.

1,341,991.             Specification of Letters Patent.      Patented June 1, 1920.

No Drawing.      Application filed August 31, 1918.   Serial No. 252,150.

*To all whom it may concern:*

Be it known that I, Miss CARMEN OLGA LOTTERO, a subject of the King of Italy, residing at the city of Buenos Aires, Argentina, have invented certain new and useful Improvements in Proceedings for the Production of a Paste Destined for the Manufacture of Paper, Cardboard, and the like, of which the following is a specification.

This invention relates to a new process for the production of a pulp from the roots of the lucerne (*Medicago sativa*) or of other similar plants intended for use in the manufacture of paper in general, card board and the like, in substitution of wood pulp.

The object of the present invention is to provide a process which will permit of the manufacture of pulp from lucerne for the purpose above noted in a much shorter time than is now possible.

According to the present process the roots are collected and suspended in the air to dry.

Immediately afterward they are stored in protected storehouses or deposits, in order to avoid moisture or rain which provokes fermentation of the same. After this preliminary preparation a certain quantity of dried roots is selected and after having been sifted with the object of removing any adhering earth, they are at once washed with rapidly running water.

The roots, which are preferably of an approximate length of thirty centimeters, are then put into maceration tubs, with the aggregation of 20% of lime. Eight days afterward, more or less, the roots are heated by steam or not, and with the help of a shovel or similar instrument, the maceration will be finished.

The roots are withdrawn and are passed between milling stones, submitting the same to a careful washing process with clear water.

After this process the duration of which may be extended to two or three hours, the following advantages have been obtained:

1. Trituration of the roots. 2. The bark is separated and black spots in paper are thus avoided. If a finer paste is desired, the paste can be forced through cloth, such as batiste or similar fabrics.

The paste prepared in accordance with this process without the addition of other ingredients, such as old paper, cellulose, glue, chalk, dyes, sulfate of aluminium, etc., is thus conducted to a tub in which works a helicoidal mixer or similar device in combination with an elevator which conducts the paste to a paper machine of any system.

I claim:

The process for the production of paper in general, cardboard and the like, from the roots of the lucerne (*Medicago sativa*) or of other similar plants, consisting in drying, sifting and washing the same, then submitting them to maceration for a period of about eight days in the presence of lime, next passing the same between milling stones and finally into a mixer from which the pulp is delivered to any suitable paper machine.

In testimony whereof I have affixed my signature in presence of two witnesses.

CARMEN OLGA LOTTERO.

Witnesses:
    W. FRANC,
    GIOVANNI MICELI.